United States Patent
Jeong et al.

(10) Patent No.: US 11,590,923 B2
(45) Date of Patent: Feb. 28, 2023

(54) ROOF MOUNTED AIRBAG

(71) Applicant: HYUNDAI MOBIS CO., LTD., Seoul (KR)

(72) Inventors: Ga Ram Jeong, Yongin-si (KR); Sang Won Hwangbo, Yongin-si (KR); Hae Kwon Park, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 17/377,690

(22) Filed: Jul. 16, 2021

(65) Prior Publication Data
US 2022/0017037 A1    Jan. 20, 2022

(30) Foreign Application Priority Data
Jul. 17, 2020   (KR) ................. 10-2020-0088756

(51) Int. Cl.
*B60R 21/2338*    (2011.01)
*B60R 21/214*    (2011.01)
*B60R 21/013*    (2006.01)
*B60R 21/239*    (2006.01)

(52) U.S. Cl.
CPC ........ *B60R 21/2338* (2013.01); *B60R 21/013* (2013.01); *B60R 21/214* (2013.01); *B60R 21/239* (2013.01); *B60R 2021/2395* (2013.01); *B60R 2021/23386* (2013.01)

(58) Field of Classification Search
CPC . B60R 21/2338; B60R 21/214; B60R 21/239; B60R 2021/2395; B60R 2021/23384; B60R 2021/23382
See application file for complete search history.

(56) References Cited

U.S. PATENT DOCUMENTS 2,834,606 A    5/1958   Bertrand
7,347,450 B2 *  3/2008   Williams ............... B60R 21/239
                                                280/739
(Continued)

FOREIGN PATENT DOCUMENTS

JP          6219389 B2    10/2017
KR       20210009121 A    1/2021
(Continued)

OTHER PUBLICATIONS

"Notice of Allowance Issued in U.S. Appl. No. 16/921,313", dated Aug. 3, 2021, 15 Pages.
(Continued)

*Primary Examiner* — Paul N Dickson
*Assistant Examiner* — Tiffany L Webb
(74) *Attorney, Agent, or Firm* — NovoTechIP International PLLC

(57) ABSTRACT

A roof mounted airbag is proposed. The roof mounted airbag includes: an airbag cushion having an upper portion fixed to a roof of a vehicle and configured to be expanded downward when gas is supplied therein; a vent hole formed on the airbag cushion, and configured to discharge the gas in the airbag cushion to the outside of the airbag cushion during opening of the vent hole; and a closing tether having a first end fixed to the roof of the vehicle, and a second end connected to the vent hole to close the vent hole when tension is applied thereto.

8 Claims, 6 Drawing Sheets

(56) References Cited

U.S. PATENT DOCUMENTS

| | | | |
|---|---|---|---|
| 7,597,355 B2 * | 10/2009 | Williams | B60R 21/2338 280/739 |
| 8,191,925 B2 * | 6/2012 | Williams | B60R 21/2338 280/739 |
| 8,500,165 B2 * | 8/2013 | Kwon | B60R 21/239 280/739 |
| 8,505,966 B2 * | 8/2013 | Yoo | B60R 21/214 280/729 |
| 8,646,808 B2 * | 2/2014 | Williams | B60R 21/239 280/739 |
| 9,108,590 B2 * | 8/2015 | Williams | B60R 21/239 |
| 9,150,189 B1 * | 10/2015 | Nelson | B60R 21/239 |
| 9,393,927 B2 * | 7/2016 | Kim | B60R 21/239 |
| 9,758,124 B2 * | 9/2017 | Kruse | B60R 21/013 |
| 9,873,402 B2 * | 1/2018 | Saito | B60R 21/239 |
| 10,688,955 B2 | 6/2020 | Shin et al. | |
| 11,059,449 B2 | 7/2021 | Jayakar et al. | |
| 11,117,543 B2 | 9/2021 | Jimenez et al. | |
| 11,267,431 B2 | 3/2022 | Sekizuka | |
| 11,273,786 B2 * | 3/2022 | Ostling | B60R 21/21 |
| 2017/0282841 A1 | 10/2017 | Hayashi et al. | |
| 2019/0241148 A1 | 8/2019 | Shin et al. | |
| 2019/0366968 A1 | 12/2019 | Park et al. | |
| 2020/0017058 A1 | 1/2020 | Jaradi et al. | |
| 2020/0139923 A1 | 5/2020 | Ostling et al. | |
| 2020/0223387 A1 | 7/2020 | Min | |
| 2020/0361410 A1 | 11/2020 | Jayakar et al. | |
| 2021/0031718 A1 | 2/2021 | Schultz et al. | |

FOREIGN PATENT DOCUMENTS

| | | |
|---|---|---|
| WO | 2019168579 A1 | 9/2019 |
| WO | 2019169209 A1 | 9/2019 |
| WO | 2019209442 A1 | 10/2019 |

OTHER PUBLICATIONS

"Office Action issued in U.S. Appl. No. 17/375,070", dated May 13, 2022, 29 Pages.

* cited by examiner

Collision direction

ROOF MOUNTED AIRBAG

CROSS-REFERENCE TO RELATED APPLICATIONS

The present application claims priority to Korean Patent Application No. 10-2020-0088756, filed Jul. 17, 2020, the entire contents of which is incorporated herein for all purposes by this reference.

BACKGROUND OF THE INVENTION

1. Field of the Invention

The present invention relates generally to a roof mounted airbag and, more particular, to an airbag mounted to a roof of a vehicle and configured to be expanded downward.

2. Discussion of Related Art

In general, vehicles have safety devices to safely protect passengers from collision and rollover accidents, and the safety devices include a seat belt restraining the body of a passenger and an airbag mitigating an impact when the passenger collides a vehicle body. The airbag is provided in various parts of the vehicle as needed. Such airbags include a driver seat airbag provided at a steering wheel and a passenger seat airbag provided at an instrument panel of a passenger seat.

Recently, use of autonomous vehicles has increased, and swivel seats are applied to the autonomous vehicles for the convenience of passengers. The swivel seats are adjusted so that a front seat passenger and a rear seat passenger face each other or the front seat passenger and the rear seat passenger face in opposite directions depending on a seat adjustment position, thereby causing the passengers to collide with each other during a collision of the vehicle.

Furthermore, during a collision of the vehicle, an object that flies or slides without restraint may injure the passenger.

In order to solve the above problem, a center airbag that may separate the interior of the vehicle into front and rear spaces has been applied as a conventional airbag. The conventional center airbag is designed based on the assumption that the center airbag is supported by a seatback of the front seat, so the center airbag does not have self-supporting force and has a limit in protecting the passengers.

In addition, when the passenger is restrained by the center airbag while the center airbag is rotated toward the passenger, the neck of the passenger may injure.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to provide a roof mounted airbag including a vent hole for discharging gas in an airbag cushion when a passenger is restrained by the roof mounted airbag.

According to the present invention for achieving the above objective, a roof mounted airbag may include: an airbag cushion having an upper portion fixed to a roof of a vehicle and configured to be expanded downward when gas is supplied therein.

a vent hole formed on the airbag cushion, and configured to discharge the gas externally from the airbag cushion during opening of the vent hole; and a closing tether having a first end fixed to the roof of the vehicle, and a second end connected to the vent hole to close the vent hole when tension is applied thereto.

The second end of the closing tether may be extended along an outer edge of the vent hole, and be configured to close the vent hole when the tension is applied to the closing tether.

The second end of the closing tether may be extended to the outside of the airbag cushion and have a cover configured to cover the vent hole from the outside of the airbag cushion, and when the tension is applied to the closing tether, the cover may cover the vent hole from the outside of the airbag cushion.

The vent hole may be formed at a portion of the airbag cushion spaced apart forward or rearward from the fixed first end of the closing tether in a longitudinal direction of the vehicle.

When the airbag cushion is expanded, the airbag cushion may have a form protruding toward an upper body of a passenger in a longitudinal direction of the vehicle.

When a passenger located at front or rear of the airbag cushion is supported on the airbag cushion, the second end of the closing tether may be extended to a position at which the second end of the closing tether may be brought into contact with a head of the passenger.

The roof mounted airbag may include: a trigger connecting the first end of the closing tether to the roof of the vehicle, and configured to release the connection with the first end of the closing tether or the roof of the vehicle, during operation thereof; and a controller configured to operate the trigger after a preset time has elapsed from a collision of the vehicle or the expansion of the airbag cushion.

The preset time may vary depending on a collision condition of the vehicle, a condition of the airbag cushion, or a condition of the closing tether.

The roof mounted airbag may include: an inflator configured to generate gas and to supply the generated gas into the airbag cushion.

The vent hole may be closed before the airbag cushion expands, and may be opened by an internal pressure of the airbag cushion or remain closed by the tension of the closing tether when the airbag cushion expands.

According to the present invention, the roof mounted airbag can support the head of the passenger when the head of the passenger is brought into contact with the airbag cushion. Simultaneously, the roof mounted airbag can release internal pressure of the airbag cushion and prevent injuries to the neck of the passenger. Accordingly, the safety of the roof mounted airbag can be improved.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Figure 1:
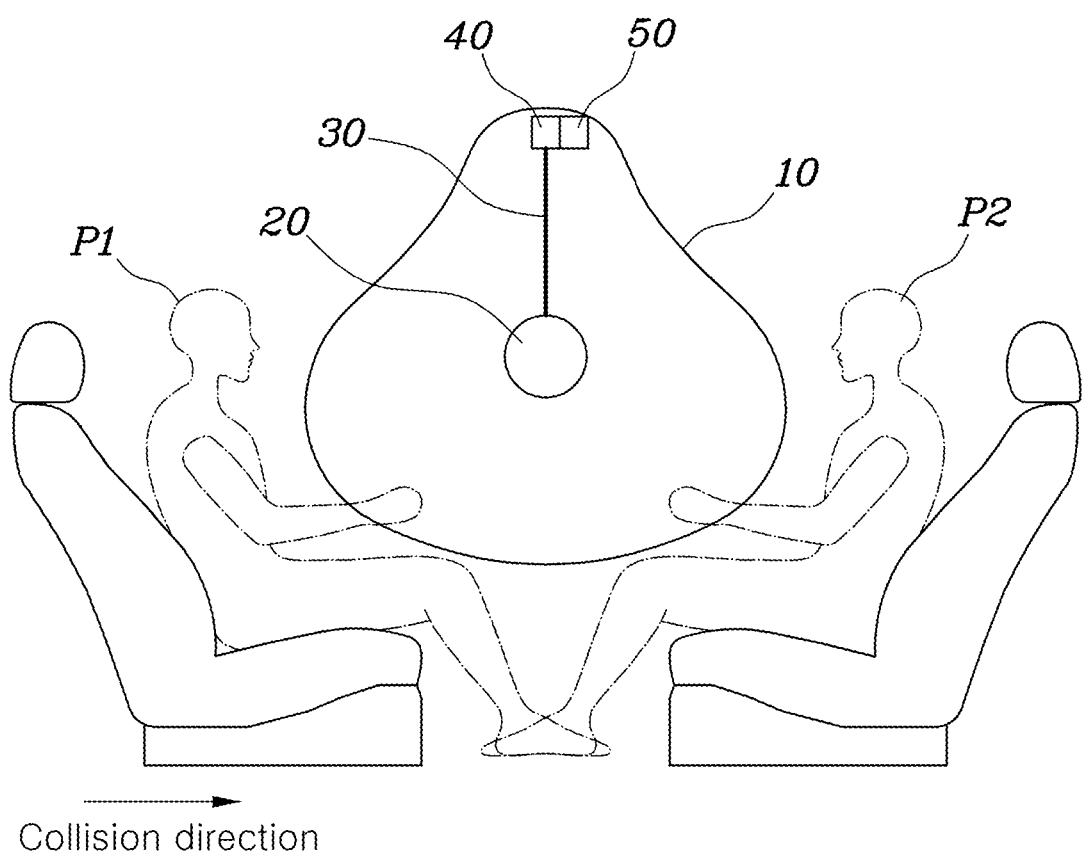
FIG. 1 is an expansion state of a roof mounted airbag according to an embodiment of the present invention.

In the following description, the structural or functional description specified to exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all of modifications, equivalents, and substitutions are included in the scope and spirit of the invention.

It will be understood that, although the terms first and/or second, etc. may be used herein to describe various elements, but these elements should not be limited by these terms. These terms are only used to distinguish one element from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

The terminology used herein is for the purpose of describing particular embodiments only and is not intended to limit the present invention. Singular forms are intended to include plural forms unless the context clearly indicates otherwise. It will be further understood that the terms "comprise" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Exemplary embodiments will be described hereafter in detail with reference to the accompanying drawings. Like reference numerals given in the drawings indicate like components.

Figure 2:
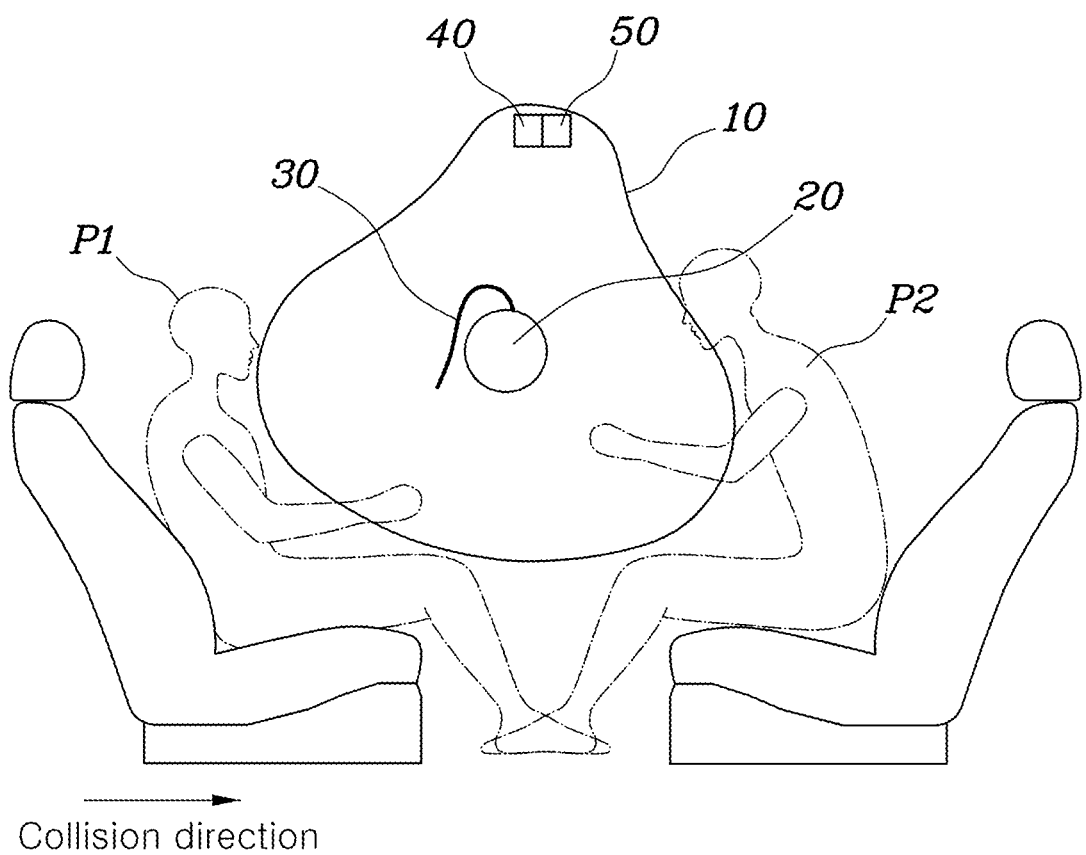
FIG. 2 is a state in which a vent hole of the roof mounted airbag is opened when passengers are supported on the roof mounted airbag according to the embodiment of the present invention.

FIG. 1 is an expansion state of a roof mounted airbag according to an embodiment of the present invention. FIG. 2 is a state in which a vent hole 20 of the roof mounted airbag is opened when passengers are supported on the roof mounted airbag according to the embodiment of the present invention.

Referring to FIGS. 1 and 2, according to the embodiment of the present invention, the roof mounted airbag includes: an airbag cushion 10 having an upper portion fixed to a roof of a vehicle and expanded downward when gas is supplied therein; the vent hole 20 provided on the airbag cushion 10, and discharging the gas in the airbag cushion 10 to the outside of the airbag cushion 10 during opening of the vent hole 20; and a closing tether 30 having a first end fixed to the roof of the vehicle and a second end connected to the vent hole 20 to close the vent hole 20 when tension is applied thereto.

The roof mounted airbag may have no restraining means restraining movement of the airbag cushion 10 without the roof of the vehicle to which an upper end of the airbag cushion is coupled, so the roof mounted airbag is freely rotated in a longitudinal direction of the vehicle.

In an event of a collision of the vehicle, the roof mounted airbag is expanded between passengers (P1 and P2) who face each other. Then, the roof mounted airbag is rotated to be moved before the head of a second passenger (P2) who is seated on a side opposite to a collision direction is supported on the roof mounted airbag, so there is a problem in that the neck of the second passenger (P2) seated on the opposite side of the collision direction is injured.

An upper portion of the airbag cushion 10 may be directly coupled to the roof of the vehicle, or may be fixed to the roof of the vehicle while be coupled to a separate fastening means. In particular, the upper end of the airbag cushion 10 may be fixed to the roof of the vehicle. When an inflator 50 to be described later generates gas, the gas may be supplied into the airbag cushion 10.

The airbag cushion 10 is expanded downward from the roof of the vehicle, so the airbag cushion 10 is expanded between the passengers (P1 and P2) facing each other toward the front of each passenger (P1, P2). Therefore, it is possible to prevent the passengers (P1 and P2) from colliding with each other.

The vent hole 20 is a hole provided on the airbag cushion 10, and may consist of one hole or a plurality of holes. As an embodiment, the vent hole 20 may be provided on a front or rear surface of the airbag cushion 10 facing one of the passengers (P1 and P2), or as another embodiment, the vent hole 20 may be provided on a side surface of the airbag cushion 10.

The vent hole 20 may be opened or closed by the closing tether 30. When the vent hole 20 is opened, the vent hole may allow the gas in the airbag cushion 10 to be discharged externally from the airbag cushion 10. Contrarily, when the vent hole 20 is closed by tension of the closing tether 30, the vent hole may limit or prevent the gas in the airbag cushion 10 from being discharged to the outside.

The first end of the closing tether 30 may be fixed to the roof of the vehicle. In particular, the first end of the closing tether 30 may be coupled to a housing of an airbag module or the inflator 50.

The second end of the closing tether 30 may be directly coupled to the vent hole 20, or may be connected to the vent hole 20 in an indirect coupling manner. In particular, as described later, the closing tether 30 may be coupled to the airbag cushion 10 surrounding the vent hole 20, or a cover 31 covering the vent hole 20, so the closing tether 30 may be coupled to the vent hole 20 to open and close the vent hole 20 in the indirect manner.

In detail, a distance between the first end and the second end of the closing tether 30 may be increased due to expansion of the airbag cushion 10, as the second end of the closing tether is coupled to the airbag cushion 10. The closing tether 30 may generate tension as the distance between the first end and the second end thereof is increased.

Figure 3A:
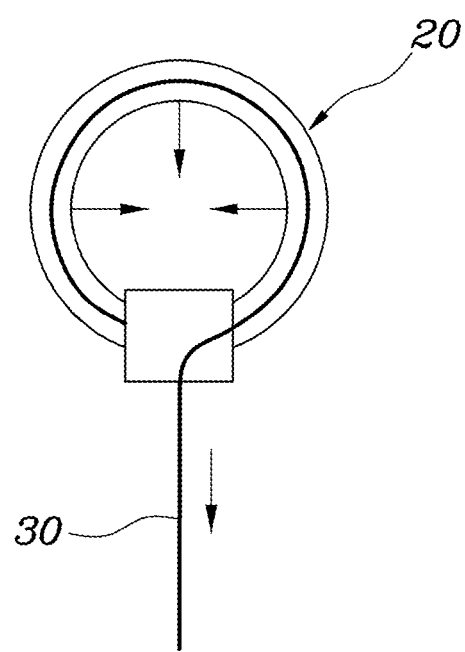
FIGS. 3A and 3B are views showing coupling between the vent hole and a closing tether according to the embodiment of the present invention.
Figure 3B:
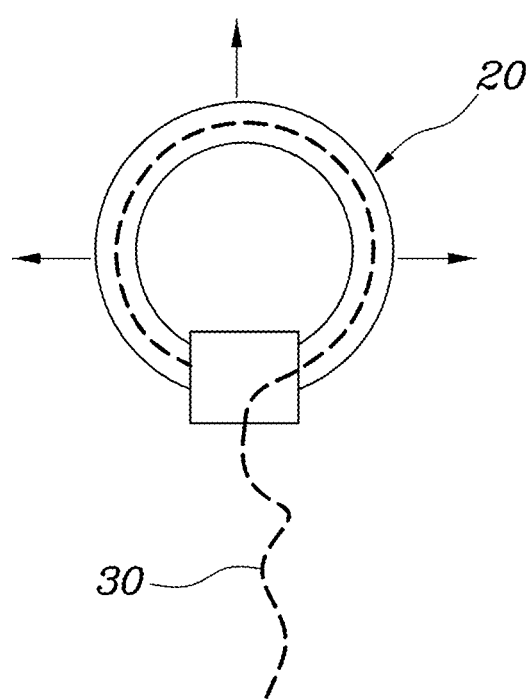

FIGS. 3A and 3B are views showing coupling between the vent hole 20 and the closing tether 30 according to the embodiment of the present invention.

Referring to FIGS. 3A and 3B, as the embodiment, the second end of the closing tether 30 extends along an outer edge of the vent hole 20, and may close the vent hole 20 when the closing tether 30 generates the tension.

The vent hole 20 is formed on the airbag cushion 10 and surrounded by the airbag cushion 10, and the second end of the closing tether 30 may be expanded along the outer edge of the airbag cushion 10 surrounding the vent hole 20.

In particular, the second end of the closing tether 30 is slidably coupled to the airbag cushion 10 to be extended along a portion or entire portion of an edge of the vent hole 20, and an end of the second end of the closing tether 30 may be securely coupled to the airbag cushion 10. Therefore, when the tension is applied to the closing tether 30, the second end of the closing tether 30 slides on the airbag cushion 10 to allow the vent hole 20 to be reduced or closed.

Figure 4A:
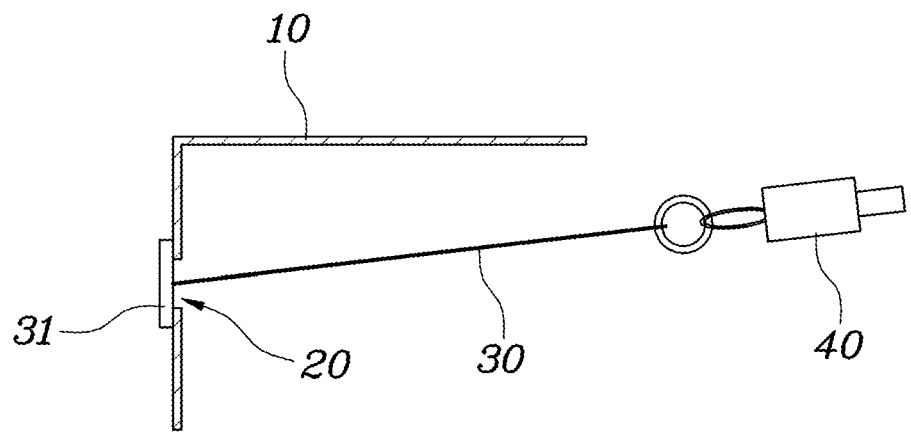
FIGS. 4A and 4B are views showing coupling between the vent hole and the closing tether according to another embodiment of the present invention.
Figure 4B:
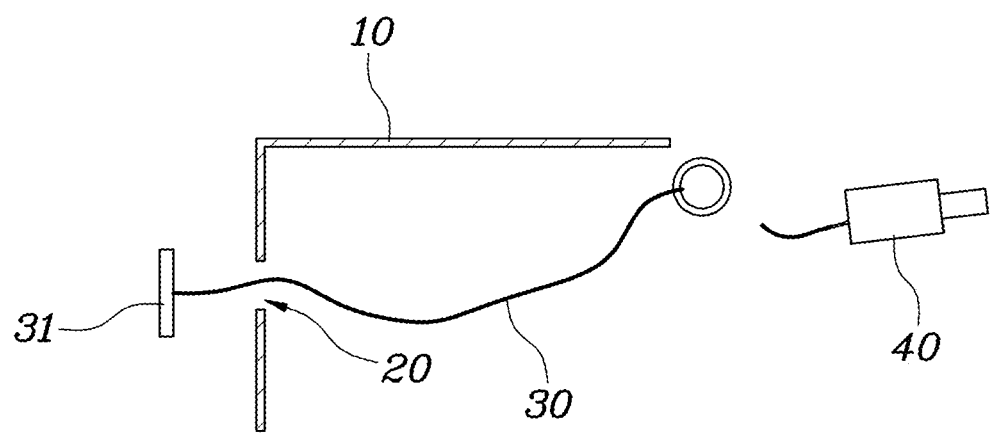

FIGS. 4A and 4B are views showing coupling between the vent hole 20 and the closing tether 30 according to another embodiment of the present invention.

Referring to FIGS. 4A and 4B, as another embodiment, the second end of the closing tether 30 has the cover 31 extended to the outside of the airbag cushion 10 and covering the vent hole 20 from the outside of the airbag cushion 10. The cover 31 may cover the vent hole 20 from the outside the airbag cushion 10 when the tension is applied to the closing tether 30.

The second end of the closing tether 30 may pass through the vent hole 20 and be extended out of the airbag cushion 10, and the cover 31 may be provided at the second end of the closing tether 30 extended to the outside of the airbag cushion 10.

In detail, the cover 31 may cover all or a portion of the vent hole 20, and one surface of the airbag cushion 10 may be extended in an extended plan direction further outward than the vent hole 20 to cover all of the vent hole 20.

Figure 5:
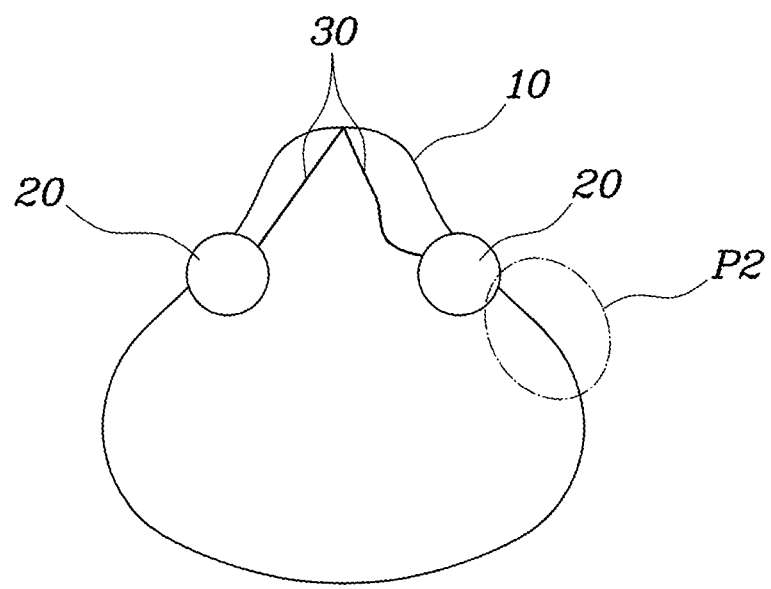
FIG. 5 is a view showing the expansion state of the roof mounted airbag according to the embodiment of the present invention.

FIG. 5 is a view showing the expansion state of the roof mounted airbag according to the embodiment of the present invention.

Referring to FIG. 5, the vent hole 20 may be provided at a portion of the airbag cushion spaced apart from and located in front of or behind the fixed first end of the closing tether 30 with respect to a longitudinal direction of the vehicle.

In detail, the second end of the closing tether 30 may be connected to the vent hole 20, and the second end of the closing tether 30 and the vent hole 20 may be provided at the portion spaced apart forward or rearward from the first end of the closing tether 30 in the longitudinal direction of the vehicle. Therefore, the distance between the first end and the second end of the closing tether 30 may vary by the expansion of the airbag cushion 10.

As another embodiment, the vent hole 20 may be located at the side surface of the airbag cushion 10. Therefore, the closing tether 30 may be slidably coupled, at a portion between the first end and the second end thereof, to a front surface or a rear surface of the airbag cushion 10. Accordingly, the distance between the first end and the second end of the closing tether 30 may vary by the expansion of the airbag cushion 10.

In particular, the airbag cushion 10 may have a shape protruding toward the upper body of the passenger (P1, P2) located at the front or rear of the vehicle in the longitudinal direction of the vehicle during the expansion of the airbag cushion 10.

As an embodiment, the airbag cushion 10 may have a shape in which a length thereof is increased in the longitudinal direction of the vehicle during the expansion of the airbag cushion, as the airbag cushion goes downward. In particular, the airbag cushion 10 has a shape protruding toward the passenger (P1, P2) at an upper body height of the passenger (P1, P2), and has a shape recessed inward at a head height of the passenger (P1, P2).

As an embodiment, the second end of the closing tether 30 may be extended to a location where the head of the passenger (P1, P2) is brought into contact therewith when the passenger (P1, P2) located at the front or rear of the vehicle is supported on the airbag.

In other words, the second end of the closing tether 30 may be coupled at a portion where the head of the passenger (P1, P2) is brought into contact so as to reduce a distance between the first end and the second end thereof as the head of the passenger is in contact with the airbag cushion when the head of the passenger is supported on the airbag cushion.

The second end of the closing tether 30 extends through the first surface or the second surface of the airbag cushion 10 and is slidably coupled to the airbag cushion 10 between the first end and the second end of the closing tether 30. Accordingly, when the head of the passenger (P1, P2) is supported on the airbag cushion 10, the distance between the first end and the second end of the closing tether 30 may be reduced.

Referring to FIGS. 4A and 4B again, the roof mounted airbag may include: a trigger 40 connecting the first end of the closing tether 30 to the roof of the vehicle, and configured, when activated, to release the connection with the first end of the closing tether 30 or the roof of the vehicle; and a controller (not shown) operating the trigger 40 after a preset time has elapsed from a collision of the vehicle or the expansion of the airbag cushion 10.

The trigger 40 may be a tether release unit (TRU), and when the trigger 40 is activated by receiving an operation signal, the trigger 40 may release the coupling to the first end of the closing tether 30 in order to remove the tension of the closing tether 30.

As an embodiment, the trigger 40 may release the connection with the roof of the vehicle by receiving the operation signal.

The controller (not shown) may activate the trigger 40 after a preset time from a timing when a collision of the vehicle is detected, or may activate the trigger 40 after a preset time after a timing when the airbag cushion 10 is expanded by the operation of the inflator 50.

The preset time may be preset as a predetermined value in response to a condition of the vehicle or an airbag device.

At the beginning of the expansion of the airbag cushion before the preset time elapses, the vent hole 20 may be closed, whereby the airbag cushion 10 is rapidly expanded and internal pressure thereof may be increased.

When the preset time has elapsed, the second passenger (P2) located at a side opposite to the collision direction of the vehicle is supported on the airbag cushion 10, whereby the airbag cushion 10 is rotated to allow the passenger a first passenger (P1) located in the collision direction of the vehicle to be in contact with the airbag cushion 10.

In the above case, the vent hole 20 may be opened in order to prevent injuries to the neck of the passenger (P1, P2) caused when internal pressure of the airbag cushion 10 is maintained.

The preset time may be preset as a time from the collision of the vehicle until the supporting of the head of the passenger (P1, P2) by a test.

As another embodiment, the preset time may vary in response to a collision condition of the vehicle, a condition of the airbag cushion 10, or a condition of the closing tether 30.

For example, the collision condition of the vehicle may be the amount of impact depending on the load of the vehicle or relative speed during a collision. The condition of the airbag cushion 10 may be the volume or the shape of the airbag cushion 10, and the condition of the closing tether 30 may be the length of the closing tether 30.

The preset time may be differently preset in response to a condition of the inflator 50, which will be described later, and the condition of the inflator 50 may include a gas generation profile of the inflator 50.

The roof mounted airbag may include the inflator 50 generating gas, and supplying the generated gas into the airbag cushion 10. In detail, the inflator 50 is located at the upper end of the airbag cushion 10, and may generate the gas in a short time when the collision signal is input into the controller (not shown) to allow the controller (not shown) to operate the inflator 50.

The vent hole 20 is closed before the airbag cushion 10 expands, and may be opened by the internal pressure of the airbag cushion 10 or remain closed by the tension of the closing tether 30 when the airbag cushion 10 expands.

The vent hole 20 provided on the airbag cushion 10 may stay closed before the expansion of the airbag cushion and generation of internal pressure of the airbag cushion. As an embodiment, the second end of the closing tether 30 may be pulled toward the first end thereof or may be in a temporary fixed state.

Therefore, at the beginning before the gas is sufficiently supplied into the airbag cushion 10, the gas in the airbag cushion 10 may be prevented from being discharged externally from the airbag cushion.

When pressure is generated in the airbag cushion 10 as the gas is supplied therein, the vent hole 20 may be opened by the internal pressure in the airbag cushion.

On the other hand, when the distance between the first end and the second end of the closing tether 30 is increased due to the expansion of the airbag cushion 10, the tension is generated and the vent hole 20 may be closed.

The vent hole 20 is closed at the beginning and the tension of the closing tether 30 is generated by the expansion of the airbag cushion 10, so the vent hole 20 may remain closed by the tension of the closing tether 30. However, when the distance between the first end and the second end of the closing tether 30 as the second end thereof is pressurized, the vent hole 20 may be opened by the internal pressure of the airbag cushion 10.

Although preferred embodiments of the present invention have been described for illustrative purposes, those skilled in the art will appreciate that various modifications, additions, and substitutions are possible, without departing from the scope and spirit of the invention as disclosed in the accompanying claims.

What is claimed is:

1. A roof mounted airbag comprising:
    an airbag cushion having (1) an upper portion coupled to a roof of a vehicle and configured to expand downward when gas is supplied to the airbag cushion and (2) a vent hole configured, when opened, to externally discharge the gas supplied to the airbag cushion; and
    a closing tether having a first end connected to the roof of the vehicle and a second end having a cover configured to at least partially close the vent hole when a tension is applied to the closing tether, wherein the cover is completely separated from the vent hole when the tension applied to the closing tether is released,
    wherein the vent hole is closed by the cover before the airbag cushion expands, and the cover is removed from the vent hole by an internal pressure of the airbag cushion.

2. The roof mounted airbag of claim 1, wherein:
    the second end of the closing tether extends to an outside of the airbag cushion via the vent hole,
    the cover is positioned outside the airbag cushion, and
    when the tension is applied to the closing tether, the cover is controlled to cover the vent hole from the outside of the airbag cushion.

3. The roof mounted airbag of claim 1, wherein the vent hole is formed at a portion of the airbag cushion spaced apart from and located in front of or behind the first end of the closing tether with respect to a longitudinal direction of the vehicle.

4. The roof mounted airbag of claim 1, wherein the airbag cushion is configured, when expanding, to protrude toward an upper body of a passenger in a longitudinal direction of the vehicle.

5. The roof mounted airbag of claim 4, wherein the second end of the closing tether is configured to extend to a position at which the second end of the closing tether is brought into contact with a head of a passenger located in front of or behind the airbag cushion.

6. The roof mounted airbag of claim 1, further comprising:
    a trigger configured to release, when activated, a connection between the first end of the closing tether and the roof of the vehicle and configured; and
    a controller configured to activate the trigger after a preset time has elapsed from a collision of the vehicle or the expansion of the airbag cushion.

7. The roof mounted airbag of claim 6, wherein the preset time is determined based on a collision condition of the vehicle, a condition of the airbag cushion, or a condition of the closing tether.

8. The roof mounted airbag of claim 1, further comprising an inflator configured to generate and supply the gas into the airbag cushion.

* * * * *